March 1, 1966  L. N. DE VOS  3,237,442
APPARATUS FOR CHECKING INVOLUTE FORMS
AND METHOD OF OPERATING SAME
Original Filed April 18, 1961  3 Sheets-Sheet 1

INVENTOR.
LEON N. DeVOS
BY John R. Faulkner
Donald J. Harrington
ATTORNEYS.

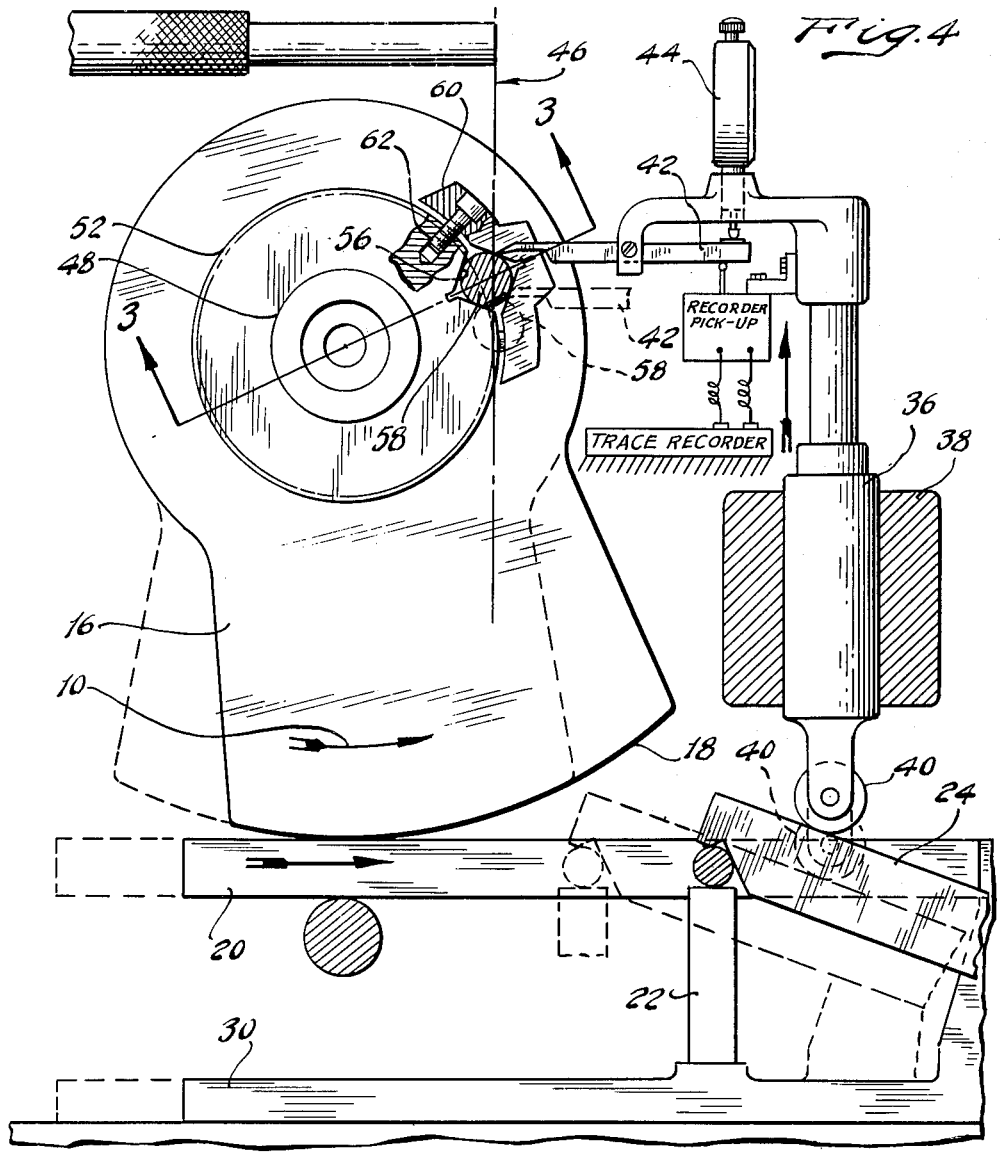
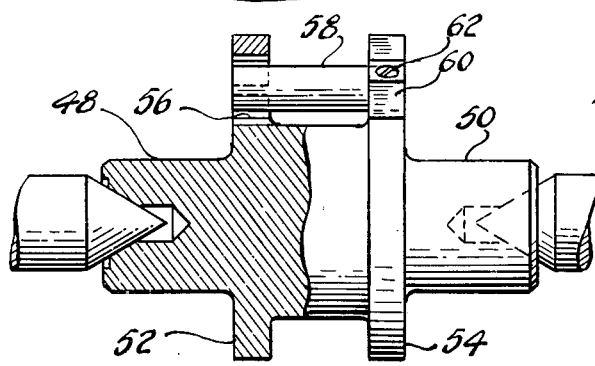

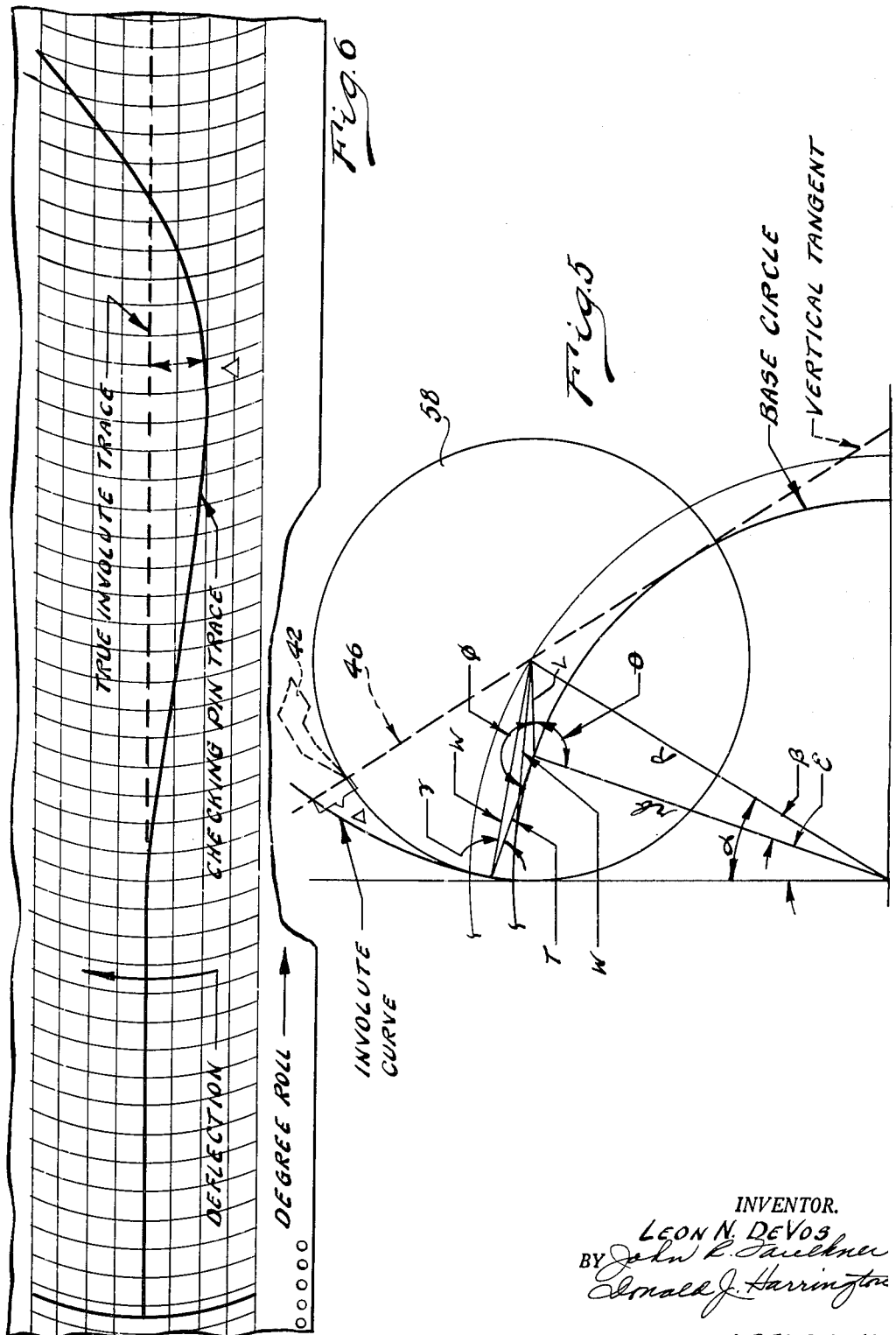

United States Patent Office 3,237,442
Patented Mar. 1, 1966

3,237,442
APPARATUS FOR CHECKING INVOLUTE FORMS AND METHOD OF OPERATING SAME
Leon N. De Vos, South Lyon, Mich., assignor to Ford Motor Company, Dearborn, Mich., a corporation of Delaware
Continuation of application Ser. No. 103,857, Apr. 18, 1961. This application Jan. 21, 1963, Ser. No. 253,525
6 Claims. (Cl. 73—1)

My invention comprises an apparatus capable of checking the involute forms of gear teeth and a method of carrying out the checking operation The improvements of my invention can be utilized in calibrating involute checkers of known construction.

I am aware of various involute checkers that can be used for determining the degree of variation of involute gear tooth forms from a theoretical involute profile. These involute checkers are unreliable, however, when they are used for checking close tolerance gears. I have observed that in many instances the results obtained by using a checking instrument of known construction could not be duplicated upon checking the same gear a second time. Also, I have found that the results of one checking instrument do not agree always with the results of another. The error may be as much as ±.0005 inch.

It is conventional practice to calibrate involute checkers by employing a master involute form and observing the deviation between the measured form and the involute form of the master. The master involute form itself may be in error, however, since it in turn must be checked by another involute checker. One error thus can be compounded upon another. As a result, the master involute forms that are used in industry are of unknown accuracy.

I have provided a means for calibrating involute checkers so that a compensation can be made in the checker itself while measuring the involute form for any given specimen.

In carrying out the principles of my invention, I employ a pin of known radius situated within an arbor with the center of the pin located a predetermined distance from the center of the arbor. The distance that is appropriate depends upon the diameter of the base circle for the involute gear specimen that is being inspected. The degree of variation of the cylindrical surface of the pin from a true involute form can be calculated for each degree of roll for the arbor, and this calculated deviation can be compared to the deviation that is measured by the involute checker. Once having established the error inherent in the checker, appropriate compensation can be made when the checker is used in checking an involute gear having a base circle diameter of appropriate size.

This application is a continuation of my earlier application, S.N. 103,857, filed April 18, 1961, now abandoned.

For the purpose of particularly describing the improvement of my invention, reference will be made to the accompanying drawings wherein:

FIGURE 3 is a side elevational view, partly in section, of an arbor and pin assembly that is used during the calibration operation;

FIGURE 4 is a cross sectional view showing the arbor of FIGURE 3 mounted in a calibrator;

FIGURE 5 is an illustration in schematic form of the arbor and pin assembly together with appropriate construction lines to illustrate the involute geometry; and FIGURE 6 is a trace from a suitable recording instrument that shows the deviation from a true involute that is measured by the involute checker.

Figure 1:
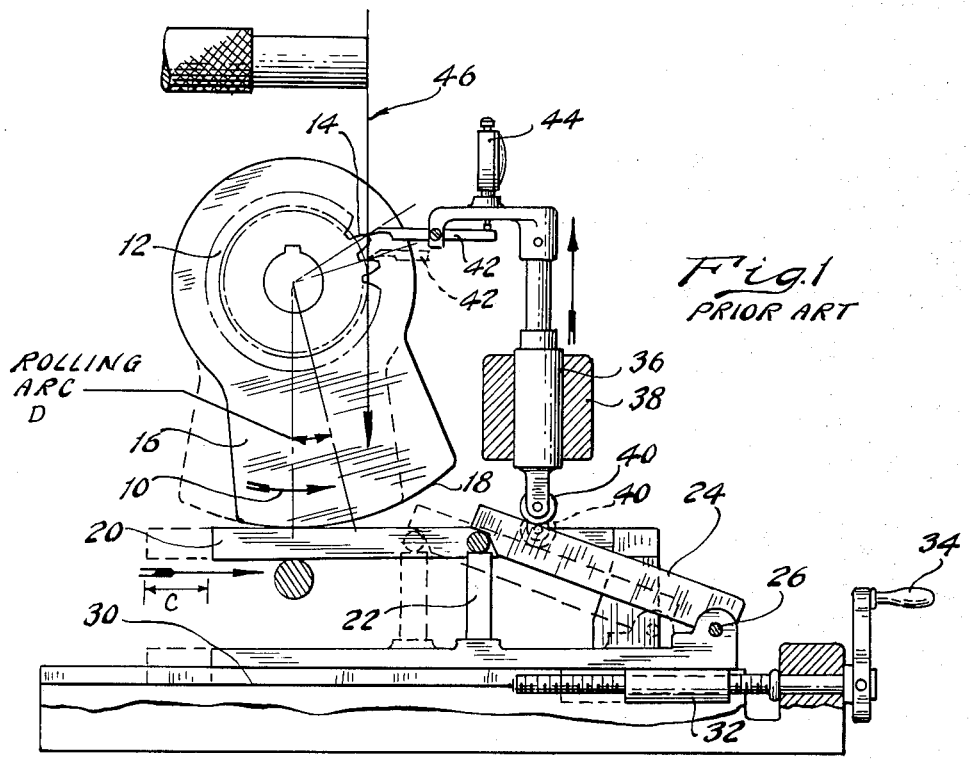
FIGURE 1 is a schematic illustration of a typical involute checker of known construction.

Referring first to FIGURE 1, numeral 10 designates a disc on which is carried a specimen 12 having involute teeth 14. The disc 10 is formed with an extension 16 on which is formed an arc 18. The arc 18 engages a slide 20 whereby a frictional driving relationship is established between extension 16 and slide 20. The slide 20 is adapted to be moved transversely with respect to the axis of the specimen 12. The displacement of the slide 20 is designated in FIGURE 1 by the symbol "C." When slide 20 is displaced, the disc 10 is displaced angularly. For any given displacement C the specimen 12 moves through a rolling arc D.

The slide 20 carries a sine bar setting gage 22 that supports one end of a sine bar 24. A pivotal connection 26 is formed between the slide 20 and the other end of the sine bar 24.

The angularity of the sine bar 24 with respect to a horizontal reference axis can be positioned appropriately by means of the sine bar setting gage 22.

The slide 20 is mounted appropriately on a table 30, and it can be adjusted relative to table 30 by a manual adjusting means 32. A hand wheel 34 can be provided for obtaining this adjustment.

An indicator slide 36 is mounted suitably within a relatively fixed sleeve 38, and it carries on the lowermost extremity thereof a roller 40. The sine bar 34 is engaged by the roller 40, and the position of the indicator 36 relative to the sleeve 38 thus will be determined by the magnitude of the displacement C of the slide 20.

The upper extremity of the indicator slide 36 carries a pointer 42. The vertical displacement of the pointer 42 relative to slide 36 can be measured by an indicator dial 44.

The extremity of the pointer 42 is adapted to engage the profile surface of one of the teeth 14. The point of contact of the pointer 42 with the tooth 14 is located on the vertical tangent line indicated at 46.

When the hand wheel 34 is rotated, the slide 20 is displaced, as previously indicated. This causes the specimen 12 to rotate in either one direction or the other, depending upon the direction of movement of the slide 20. The sine bar is situated so that the vertical displacement of the indicator 36 is equal to the vertical displacement of the point of contact of the pointer 42 with respect to the tooth 14 being measured.

Figure 2:
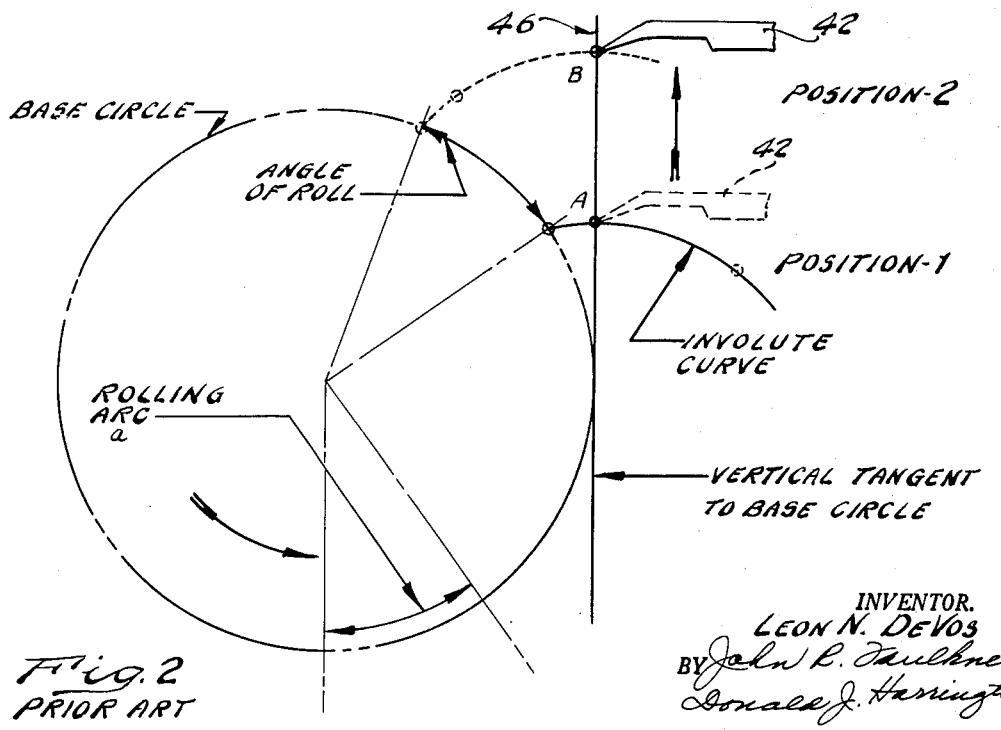
FIGURE 2 is a diagram illustrating involute geometry associated with the checker of FIGURE 1.

Referring next to FIGURE 2, I have illustrated in schematic form the geometric relationship between the base circle of the specimen 12 and the involute surface of the teeth 14. Points A and B represent the location of the point of contact between the pointer 42 and the tooth 14 when the specimen 12 is rotated through an arc "a." Upon displacement of the specimen 12 through the arc "a," the point of contact moves from point A to point B along tangent line 46. Since the configuration of FIGURE 2 is a true involute, the actual distance between points A and B is equal to the length of the arc "a."

When the checker is calibrated suitably, the vertical displacement of the indicator 36 by the sine bar 24 will equal exactly the vertical displacement of the pointer 42 by the tooth 14. The change in reading of the dial indicator 44 then should be zero if the involute profile for the teeth 14 is in fact a true involute.

An appropriate recording instrument can be provided as shown schematically in FIGURE 4 for recording the deflection of the dial indicator for any given degree of roll for the specimen 12. The recording instrument pickup is carried by slide 36. When the degree of roll is plotted against the displacement measured by the dial indicator, the resulting trace will be a straight line. The degree to which the trace deviates from a straight line should be a measure of the accuracy of the involute profile. A typical trace is shown in FIGURE 6.

For the purpose of checking the involute checker, I have provided an arbor of the type shown in FIGURES 3 and 4. This arbor includes mounting centers 48 and 50 together with central hub portions 52 and 54. Each hub portion is formed with a notch, the notch for the portion 52 being shown in FIGURE 4 at 56. This notch is machined accurately so that the depth thereof will be of the desired value. A pin 58 of predetermined diameter is received within the notch, and it is held in place by a clamp 60. Suitable screws 62 can be provided for retaining the clamp 60 in place.

The arbor of FIGURES 3 and 4 can be inserted in the checker shown in FIGURE 1 in place of the specimen 12, and the pointer 42 can be adjusted so that it will engage the surface of the pin 58. The diameter of the pin and the size of the arbor are chosen so that the surface of the pin 58 will be situated at radii that correspond to the radii between which the involute surface of the specimen 12 is located.

It will be apparent that when the slide 20 is actuated, the indicator 44 will record the deviation of the surface of the pin 58 from a true involute profile, and this deviation will be recorded on a trace of a suitable recording instrument. It will be apparent also that the point of tangency between the pointer 42 and the surface of the pin 58 will be displaced vertically along line 46 as the arbor is rotated. Referring next to FIGURE 5, this displacement is illustrated for any given angle of roll.

The distance measured along the tangent to the base circle from the involute profile surface to the surface of the pin 58 can be calculated. The method of calculation is set forth as follows:

$$\cos \alpha = \frac{(rb)^2 + R^2 - W^2}{2rbR}$$

$$\beta = \alpha - \epsilon$$

$$L^2 = (rb)^2 + R^2 - 2rbR \cos \beta$$

$$\cos \theta = \frac{(rb)^2 + L^2 - R^2}{2rbL}$$

$\sin \phi$ is numerically equal to $\cos \theta$ and is always positive. $\phi$ is obtuse for values of $\epsilon < \alpha$, acute for values of $\epsilon > \alpha$.

$$\sin \gamma = \frac{L \sin \phi}{W}$$

$$T = \frac{W \sin (\phi + \gamma)}{\sin \phi}$$

$$\rho = (rb) \text{ arc } \epsilon$$

$$\Delta = T - \rho$$

Where:

$(rb)$ = Base radius
$R$ = Radius from center of arbor to center of pin
$W$ = Pin radius
$\epsilon$ = Roll angle
$\rho$ = Radius of curvature of involute at any given point on the involute curve
$T$ = Distance on $\rho$ from tangent point of base circle to pin circle
$\Delta$ = Deviation of pin from involute
$\alpha$ = the angle from the center of the pin to the contact between the pin circumference and the base circle
$\beta$ = The angle between the center of the pin and the point of tangency on the base circle.
$\epsilon$ = The angle that the base circle must rotate in order to have a predetermined point on the involute curve contact a tangent to the base circle.
$\gamma$ = The angle between the tangent to the base circle and a line from a point on the pin circumference, where it joins the base circle tangent, to the center of the pin.

For any given angle of roll the actual deviation from a true involute thus can be calculated with any desired degree of accuracy. These calculated values then can be compared to the deviation on the trace of FIGURE 6 for each angle of roll. If the measured value as recorded in FIGURE 6 differs from the calculated value, the error is noted, and appropriate compensation thus can be made in the checking machine during a subsequent measurement of a gear tooth profile surface. The original point of contact between the surface of the pin and the pointer is predetermined by calculation. This point may be at any position corresponding to a base circle radius suited to the pin being used or at some radius greater than this base circle radius if so desired. The final point of contact (or the final point in the sweep of the pointer over the pin surface) is also predetermined and is dependent upon the degree of motion in the involute checker that is needed for an accurate inspection of the part. These points are achieved in exactly the same manner that the corresponding points are located when actual gear parts are being checked.

The angular position that the arbor should assume during a checking operation is determined by rolling the pin about the arbor axis until the recording instrument returns to a zero reading, which is predetermined by different methods for different involute checkers. Some checkers have a setting gauge block on the tail stock, others have a gauge block which mounts between centers, etc.

The accuracy of this master gauge is limited only by the operator's ability to measure the pin diameter and its location with respect to the center line of the arbor. This can be done within limits of ±.00001 inch.

Having thus described a preferred embodiment of my invention, what I claim and desire to secure by U.S. Letters Patent is:

1. An arbor for use in calibrating an involute gear checker comprising a pair of mounting portions and a central portion of relatively large diameter, said mounting portions being adapted to support said arbor during rotation thereof about a central axis, a notch formed in the outer periphery of said central portion and defining intersecting pin locating surfaces, a circular pin of predetermined diameter located in said notch and engaging said locating surfaces, the diameter of said pin, the dimensions of said notch, and the dimensions of said central portion being such that the circular surface of said pin will be located at a radius that is substantially equal to the radius of the involute surface of the corresponding involute gear to be checked by said checker, said radii being measured from said central axis.

2. A method for checking an involute gear checker comprising the steps of mounting an arbor for rotation about an axis corresponding to the axis of the gear, locating a pin of predetermined diameter on the arbor with the axis of the pin parallel to the axis of the arbor, mounting an indicator adjacent said arbor with the pointer thereof engagable with said pin, adapting said pointer for movement along a line tangent to a circle corresponding to the base circle of the corresponding gear, means for actuating said indicator to provide for a displacement of said pointer that is related proportionately to the degree of roll of said arbor, measuring the displacement of said pointer relative to supporting portions of said indicator for each degree of roll of said arbor, and computing analytically the deviation of the surface of said pin from a true involute form and comparing said computed deviation with the measured deviation recorded by said indicator.

3. A method for checking a gear profile checker comprising the steps of mounting an arbor for rotation about an axis corresponding to the axis for the gear specimen to be checked, locating a round member of predetermined diameter on the arbor, mounting an indicator adjacent said arbor, said indicator having a motion pick-up member carried thereon, engaging said round member with said pick-up member, adapting said pick-up member for movement along a line tangent to a circle corresponding to the base circle for the gear specimen, actuating said indicator to provide a displacement of said pick-up member that is proportional in magnitude to the degree of roll of said arbor, measuring the displacement of said pick-up member relative to supporting portions of said indicator, computing the deviation of the surface of said round member from a true involute form and comparing the computed deviation with the measured deviation recorded by said indicator.

4. An arbor for use in calibrating a gear tooth profile checker comprising mounting portions adapted to support said arbor for rotation about its geometric axis, another portion of said arbor being formed with a recess of predetermined dimension, said recess defining a locating surface, a round member of predetermined radius located in said recess and engaging said locating surface, the diameter of said round member, the dimension of said recess and the radial location of said recess being such that the surface of said round member will be located at a radius that is substantially equal to the radius of the surface of a corresponding gear to be checked by said checker, said radii being measured from said geometric axis.

5. A method for checking a gear profile checker comprising the steps of mounting an arbor for rotation about an axis corresponding to the axis for the gear specimen to be checked, locating on the arbor a checking member having formed thereon a segment of a circle of predetermined diameter, mounting an indicator adjacent said arbor, said indicator having a motion pick-up member carried thereon, engaging said checking member with said pick-up member, adapting said pick-up member for movement along a line tangent to a circle corresponding to the base circle for the gear specimen, actuating said indicator to provide a displacement of said pick-up member that is proportional in magnitude to the degree of roll of said arbor, measuring the displacement of said pick-up member relative to supporting portions of said indicator, computing the deviation of the surface of said checking member from a true involute form and comparing the computed deviation with the measured deviation recorded by said indicator.

6. An arbor for use in calibrating a gear tooth profile checker comprising mounting portions adapted to support said arbor for rotation about its geometric axis, another portion of said arbor being formed with a locating surface of predetermined dimensions and radial position, a checking member having formed thereon an arcuate surface of predetermined radius positioned on said locating surface, the dimensions of said checking member, the dimensions of said locating surface and the radial position of said locating surface being such that the arcuate surface of said checking member will be located at a radius that is substantially equal to the radius of the surface of the corresponding gear to be checked by said checker, said radii being measured from said geometric axis.

References Cited by the Examiner

UNITED STATES PATENTS 3,165,840  1/1965  Woditsch _____ 33—174

FOREIGN PATENTS 563,219  8/1944  Great Britain.
569,560  5/1945  Great Britain.
871,528  3/1953  Germany.

ROBERT B. HULL, *Primary Examiner.*

S. S. MATTHEWS, *Assistant Examiner.*